US007166814B2

(12) United States Patent
Nakanishi et al.

(10) Patent No.: US 7,166,814 B2
(45) Date of Patent: Jan. 23, 2007

(54) SORTING MACHINE

(75) Inventors: Ken Nakanishi, Tokyo (JP); Tetsuo Ogata, Tokyo (JP)

(73) Assignee: NEC Corporation, Tokyo (JP)

( * ) Notice: Subject to any disclaimer, the term of this patent is extended or adjusted under 35 U.S.C. 154(b) by 109 days.

(21) Appl. No.: 10/426,853

(22) Filed: May 1, 2003

(65) Prior Publication Data

US 2003/0209474 A1 Nov. 13, 2003

(30) Foreign Application Priority Data

May 8, 2002 (JP) ............................ 2002-133215

(51) Int. Cl.
*B65G 47/00* (2006.01)

(52) U.S. Cl. ...................... 209/584; 209/912; 209/922; 198/370.03

(58) Field of Classification Search ................ 209/583, 209/584, 900, 912, 922, 923, 933; 198/370.03, 198/370.04, 704, 839
See application file for complete search history.

(56) References Cited

U.S. PATENT DOCUMENTS 3,848,728 A * 11/1974 Leibrick et al. ....... 198/370.04
4,008,813 A * 2/1977 Leersnijder ................. 414/265
4,303,503 A * 12/1981 de Mimerand et al. ....... 209/3.3
4,310,276 A * 1/1982 Castagnoli ............... 198/367.1
4,567,988 A * 2/1986 Weibel ....................... 209/564
4,984,676 A * 1/1991 Michel .................. 198/370.04
5,090,552 A * 2/1992 Fukuyama et al. .... 198/370.04
5,419,457 A * 5/1995 Ross et al. .................. 209/616
5,570,773 A * 11/1996 Bonnet .................. 198/370.04
6,478,138 B1 * 11/2002 Edwards et al. ....... 198/370.06
6,554,123 B2 * 4/2003 Bonnet .................. 198/370.04
6,946,612 B2 * 9/2005 Morikawa ................... 209/584
2002/0179502 A1 * 12/2002 Cerutti et al. ............... 209/583

* cited by examiner

*Primary Examiner*—Joseph C. Rodriguez
(74) *Attorney, Agent, or Firm*—Sughrue Mion, PLLC

(57) ABSTRACT

The sorting machine main body of a sorting machine is a slender machine provided with a chain conveyer along an upper and lower two level endless loop route, and includes an IN side turn back portion, a transfer portion, a sorting portion, an OUT side turn back portion in this order from the IN side. Gathering boxes are provided on both the left and right sides in the advancing direction of the chain conveyer. A plurality of carrier boxes hangs from the chain conveyer. The carrier boxes are thrown with loads at the transfer portion, and are delivered by the chain conveyer and discharges the loads at a predetermined location according to the loads. The belt conveyer conveys the discharged loads to the gathering box.

13 Claims, 6 Drawing Sheets

SORTING MACHINE

BACKGROUND OF THE INVENTION

1. Field of the Invention

In general, the present invention relates to a sorting machine and, more particularly, to a sorting machine, which feeds a sorted item into a carrier box, delivers the sorted item, and discharges the sorted item from the carrier box at a predetermined location according to the sorted item.

2. Description of the Related Prior Art

Heretofore, various sorting machines have been put to practical use, which automatically sort according to a different destination a thin paper category such as post cards, letters, periodicals, catalogues, books and the like or a flat mail item such as CD, video cassettes and the like (hereinafter, referred to as a lightweight mail item), which are delivered by mail or courier service.

Among the above-described sorting machines, there are some sorting machines, which perform the sorting in such a manner as to feed the lightweight mail item into the carrier box, deliver it, open the bottom lid of the carrier box at a predetermined location according to each lightweight mail item, and allow the lightweight mail item to be dropped into a sorting port.

Now, a conventional sorting machine will be described below with reference to the drawings.

FIG. 1 is a schematic top view for explaining the entire structure of the conventional sorting machine, and FIG. 2 shows a front view thereof.

Further, FIG. 3 is a view for explaining the sectional structure of essential portions of the conventional sorting machine, and shows a schematically enlarged sectional view taken on line M—M of FIG. 1.

Referring to FIGS. 1 and 2, a sorting machine 100 comprises a sorting machine main body 110 for sorting the lightweight mail item and a feeder 120 for feeding the lightweight mail item into the sorting machine main body 110.

The sorting machine main body 110 is a slender machine of an upper and lower two level structure, and comprises a chain conveyer 130 along a double endless loop route. The sorting machine main body 110 comprises an IN side turn back portion 111, a transfer portion 112, an intermediate turn back portion 113, a sorting portion 114, and an OUT side turn back portion 115 in this order from the IN side.

When seen from above, a chain conveyer 130 has two almost oval chain conveyers, which are different in the length of a longitudinal direction, and are connected mutually at the OUT side turn back portion 115.

Specifically, this double endless loop route comprises a line P provided in the near side intermediate level of the sorting machine main body 110, a line P-Q inside of the IN side turn back portion 111, a line Q provided in the innermost side upper level coupled with the line P by the line P-Q, a line Q-R inside of the OUT side turn back portion 115, a line R provided in the near side upper level coupled with the line Q by the line Q-R, a line R-S inside of the intermediate turn back portion 113, a line S provided in the innermost side intermediate level coupled with the line R by the line R-S, and a line S-P inside of the OUT side turn back portion 115 which connects the line S and the line P.

Referring now to FIG. 1, between the sorting portion 114 and the OUT side turn back portion 115, the line Q, the line Q-R, and the line R are shown by a solid line, and the line P, the line S, and the line S-P are shown by a chain line. Although the solid line and the chain line substantially lie one-upon-another, they are illustrated in such a manner as to be shifted from one another for better understanding.

As shown in FIG. 3, a plurality of carrier boxes 131 hangs from the chain conveyer 130. The chain conveyer 130 delivers these carrier boxes 131.

This carrier box 131 is a carrier box capable of housing and delivering the lightweight mail item. The carrier box 131 has an opening portion at an outer peripheral side surface for throwing the lightweight mail item, and has a bottom lid 139 at the bottom for allowing the lightweight mail item to be dropped at a predetermined location. Moreover, the carrier box 131 is provided with bottom lid opening and closing means (not shown).

Further, the carrier box 131 is provided with a plurality of compartments in the advancing direction so that the lightweight mail items can be effectively delivered. In such a case, the bottom lid opening and closing means is provided for each compartment.

The transfer portion 112 is coupled with a feeder 120 comprising a transfer belt 121. In this feeder 120, the transfer belt 121 transfers the lightweight mail item to the transfer portion 112 one by one. The transfer portion 112 throws the lightweight mail item transferred by the transfer belt 121 into the carrier box 131. For example, when a plurality of sorting compartments is formed in the carrier box 131, one lightweight mail item is thrown into one sorting compartment.

In general, the transfer potion 112 is coupled with a plurality of feeders 120 according to the processing speed of the feeder 120.

The sorting portion 114 has gathering boxes 132 juxtaposed below the carrier box 131 of each line.

A controller (not shown) of the sorting machine 100 opens the bottom lid 139 of the carrier box 131, which delivers the lightweight mail item, by using the bottom lid opening and closing means at a predetermined location according to each lightweight mail item. The lightweight mail item drops into the gathering box 132 into which it is to be sorted. The sorting machine 100 sorts the lightweight mail item in such a way.

Incidentally, the gathering box 132 is a rectangular box-shaped container. Hence, the port of the direct gathering box 132 becomes a sorting port for sorting the lightweight mail item, which is dropped from the above portion.

SUMMARY OF THE INVENTION

An object of the present invention is to provide a sorting machine, which can shorten the length of the machine and, as a result, save an installation space.

A sorting machine of a first embodiment of the present invention comprises a carrier portion for mounting a load, a delivery portion for delivering the carrier portion along a delivery route, a gathering portion for gathering the loads which are placed at both the left and right sides of the carrier route, and a conveyance portion for conveying the loads from a location on the delivery route to the gathering portion.

A sorting machine of a second embodiment of the present invention comprises a carrier portion for mounting a load, a delivery portion for delivering the carrier portion along a first delivery route and a second delivery route, a first gathering portion for gathering the loads placed at both the left and right sides of the first delivery route, a second gathering portion for gathering the loads placed below the second delivery route, and a conveyance portion for conveying the loads from a location on the first delivery route to the first gathering portion.

BRIEF DESCRIPTION OF THE DRAWINGS

The above and other objects, features and advantages of the present invention will become more apparent from the following detailed description of the preferred embodiments of the invention in conjunction with the accompanying drawings in which.

DETAILED DESCRIPTION OF THE PREFERRED EMBODIMENTS

First Embodiment

Figure 4:
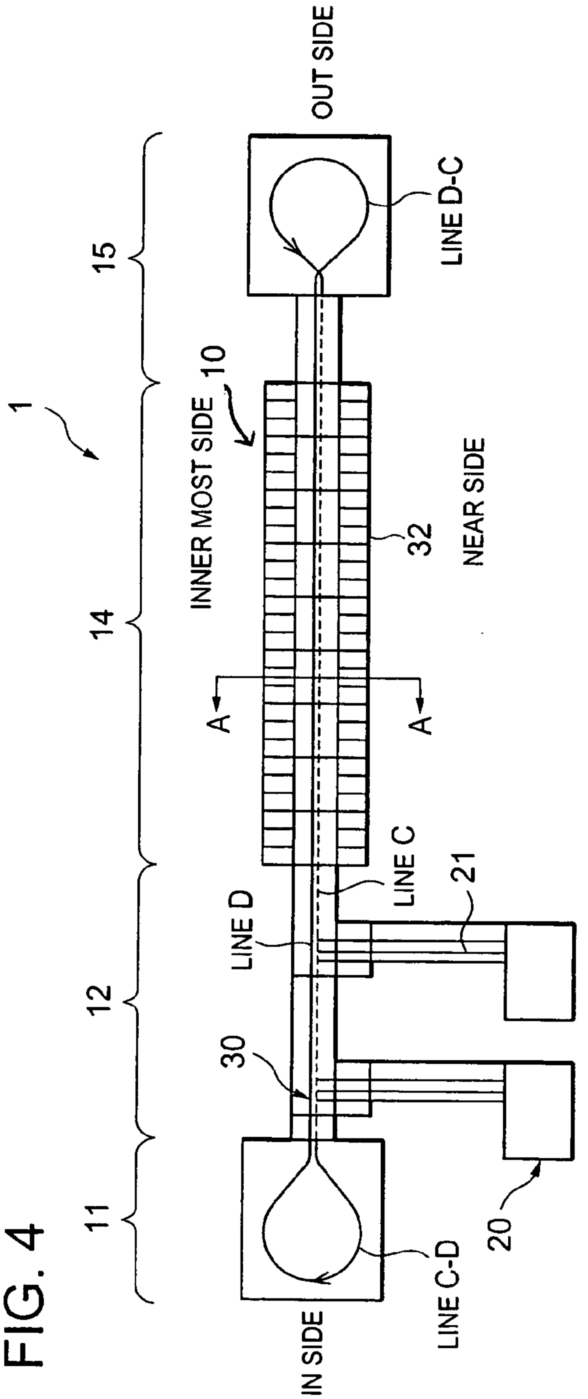
FIG. 4 is a top view of a first embodiment of the sorting machine of the present invention.
Figure 5:
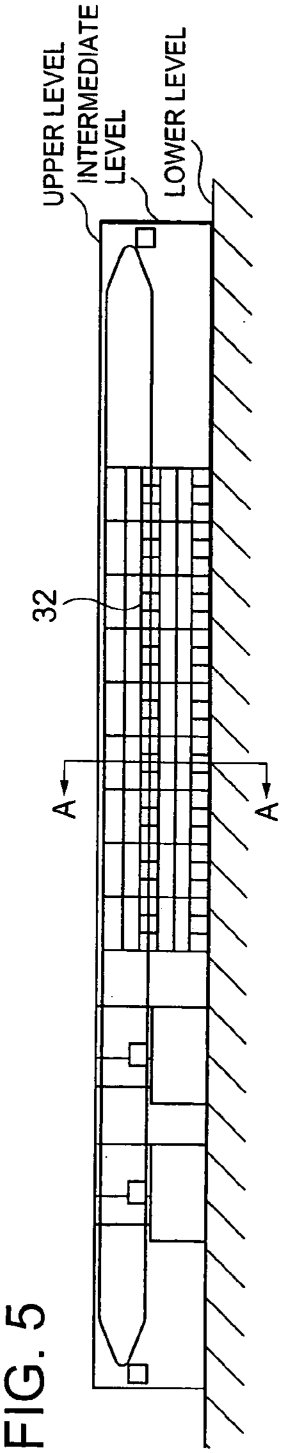
FIG. 5 is a top view of the first embodiment of the sorting machine of the present invention.

FIG. 4 is a top view showing a first embodiment of the present invention, and FIG. 5 is a front view thereof.

A sorting machine 1 includes a sorting machine main body 10 for sorting a lightweight mail item and a feeder 20 for feeding the lightweight mail item to the sorting machine main body 10.

Figure 6:
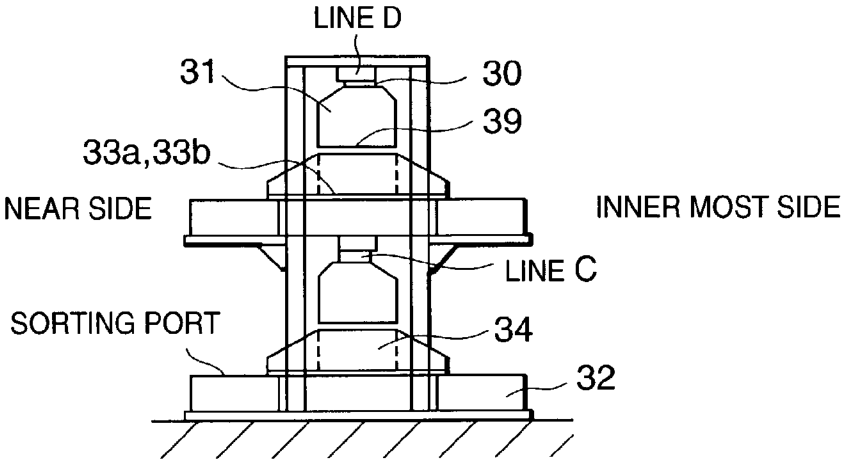
FIG. 6 is an enlarged view taken on line A—A of FIG. 5.
Figure 7:
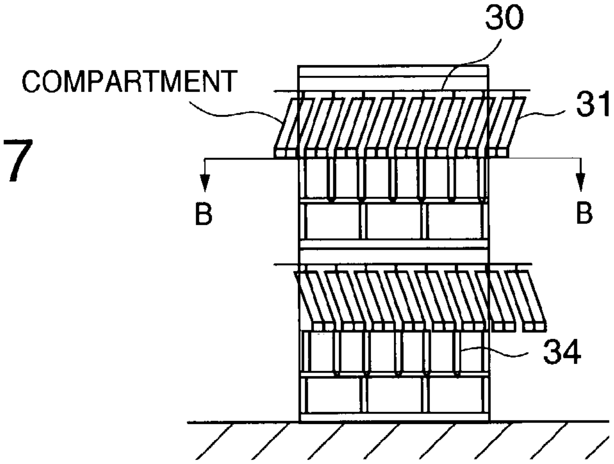
FIG. 7 is an enlarged top view of one-piece module of a sorting portion.
Figure 8:
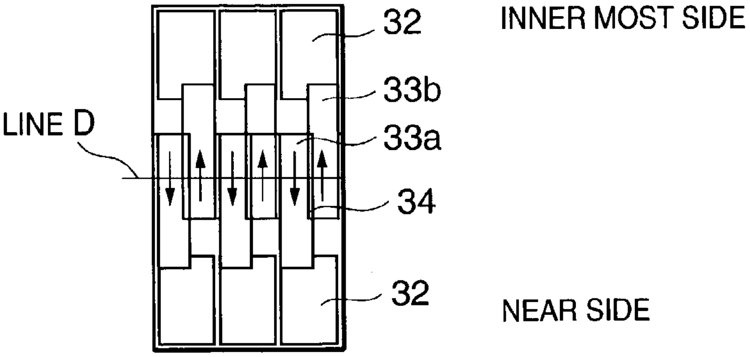
FIG. 8 is a sectional view taken on line B—B of FIG. 7.

This sorting machine main body 10 is a slender machine, and comprises an upper and lower two level endless loop routes along a chain conveyer 30. The sorting machine main body 10 includes an IN side turn back portion 11, a throwing portion 12, a sorting portion 14, and an OUT side turn back portion 15 in this order from the IN side. The sorting portion 14 is coupled with a plurality of modules. FIGS. 4 and 5 show the example in which the sorting portion 14 is formed of nine pieces of the module. FIG. 6 is an enlarged sectional view taken on line A—A of FIG. 5. FIG. 7 is an enlarged top view of one-piece module of the sorting portion 14, and FIG. 8 is a sectional view taken on line B—B of FIG. 7. FIGS. 7 and 8 show the example in which three gathering boxes 32 are placed at the upper and lower levels of the left and right sides of one piece module of the sorting portion, thereby making a total of 12 gathering boxes 32.

The endless loop routes of the upper and the intermediate levels of the chain conveyer 30 include a line C provided in the intermediate level of the sorting machine main body 10, a line C-D inside of the IN side turn back portion 11, a line D provided in the upper level coupled with the line C by the line C-D, and a line D-C inside of the OUT side turn back portion 15 which couples the line D and the line C.

Incidentally, FIG. 4 shows the line C by a chain line, and the line D by a solid line. The line C and the line D lie one-upon-another. However, in FIG. 4, they are illustrated in such a manner as to be shifted from each other for a better understanding.

Further, as shown in FIG. 7, a plurality of carrier boxes 31 hang from the chain conveyer 30.

Figure 3:
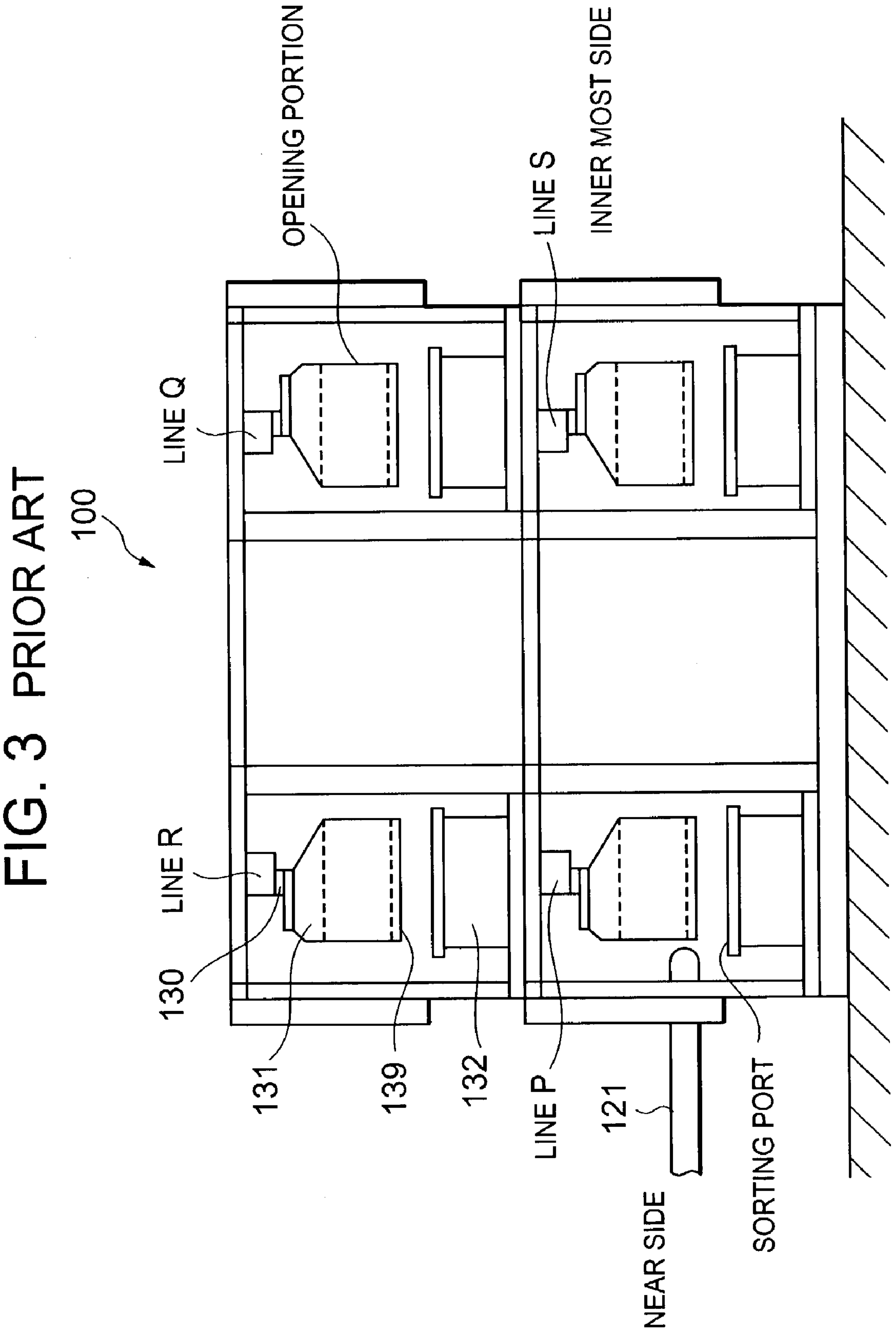
FIG. 3 PRIOR ART
FIG. 3 is a schematic enlarged view taken on line M—M of FIG. 1.

Incidentally, the structure of the carrier box 31 is the same as that of the conventional carrier box 131 shown in FIG. 3. That is, the carrier box 31 is a container capable of delivering the lightweight mail item. The carrier box 31 has an opening portion at an outer peripheral side surface for throwing the lightweight mail item, and has a bottom lid 39 at the bottom for allowing the lightweight mail item to be dropped at a predetermined location. Moreover, the carrier box 31 is provided with bottom lid opening and closing means. The controller not shown activates the bottom lid opening and closing means at a predetermined location and discharges the lightweight mail item from the carrier box 31.

Further, a plurality of compartments are provided in the traveling direction so that the carrier box 31 can usually effectively deliver the lightweight mail item and, in such a case, the bottom lid opening and closing means is provided for each compartment. FIG. 7 shows the example in which the carrier box 31 has two pieces of the compartment.

The transfer portion 12 is coupled with a feeder 20 comprising a transfer belt 21. In this feeder 20, the transfer belt 21 transfers the lightweight mail item one by one.

The transfer portion 12 throws the lightweight mail item conveyed by the transfer belt 21 into the carrier box 31. When a plurality of sorting compartments is formed in the carrier box 31, one lightweight mail item is thrown into one sorting compartment.

In general, the transfer potion 12 is coupled with a plurality of feeders 20 according to the processing speed of the feeder 20. FIG. 4 shows an example in which two sets of the feeder 20 are coupled.

The sorting processing speed of the sorting machine 1 is calculated by the multiplication of the traveling speed of the chain conveyer 30 and the delivery quantity of lightweight mail items per unit length.

In general, the feeder 20 comprising the transfer belt 21 has a feeding capacity equal to or more than the sorting processing speed of the sorting machine main body 10.

The sorting portion 14, as shown in FIG. 8, has the gathering boxes 32 juxtaposed at both the left and right sides of each line. By being so arranged, the length of the chain conveyer 30 can be shortened much more, and a reduction in the cost of the chain conveyer 30, the carrier box 31 and the like can be realized by that much.

Further, below the carrier box 31, there are alternately provided a belt conveyer 33*a* to convey loads in the neat direction and a belt conveyer 33*b* to convey loads in the innermost direction. A belt width of these belt conveyers 33*a* and 33*b* are usually almost half the width of the gathering box 32 and, by being so arranged, the gathering boxes 32 can be juxtaposed close to each other. The belt conveyers 33*a* and 33*b* convey the lightweight mail items, which are dropped from the carrier box 31, to the gathering boxes 32 and drop them into the sorting ports of the gathering boxes 32. That is, the belt conveyers 33*a* and 33*b* sort the lightweight mail items, which are dropped on the belt conveyers 33*a* and 33*b*, and gather and sort them into the corresponding gathering boxes 32.

Figure 10:
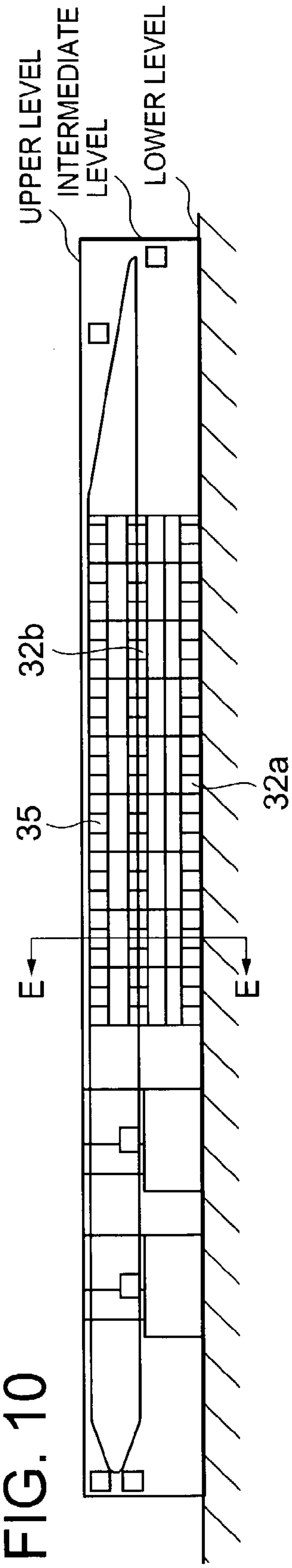
FIG. 10 is a top view of the second embodiment of the sorting machine of the present invention.

Here, it is preferably better to provide a partition board 34 to divide the belt conveyers 33*a* and 33*b* between the adjacent belt conveyers 33*a* and 33*b*. The present embodiment, as shown in FIG. 10, has six pieces of the belt conveyers 33*a* and 33*b* in the lower level (or the upper level)

of one piece of the module, and has seven pieces of the partition board 34 including both ends. By using the partition board 34 of the adjacent module, the partition board 34 in one end portion is omitted, and thereby, the number of partition board 34 of the lower level (or the upper level) of one piece of the module may be reduced to six pieces.

The partition board 34 is provided so that problems such as falling down of the lightweight mail items on the adjacent belt conveyers 33*a* and 33*b* or the lightweight mail items dropped on the adjacent belt conveyers 33*a* and 33*b* being brought into contact with each other and not conveyed to the gathering boxes 32 can be prevented.

In FIG. 6, though the belt conveyers 33*a* and 33*b* are horizontally installed, they are not limited to this way of installation, but may be installed by being sloped laterally.

By allowing the belt conveyers 33*a* and 33*b* to slope in the direction lowered to the gathering boxes 32 or raised to the gathering boxes 32, the height of the gathering boxes 32 can be changed and, therefore, the gathering boxes 32 can be installed at the height convenient for the operation to be performed.

Although the belt conveyers 33*a* and 33*b* are always in operation, they are not limited to this way of operation. For example, only those belt conveyers 33*a* and 33*b*, on which the lightweight mail items are dropped, may be put into operation for a required period alone.

As described above, since the sorting machine 1 of the present embodiment has the gathering boxes 32 juxtaposed at both the left and right sides of the chain conveyer 30, the length of the chain conveyer 30 per one gathering box 32 can be made half that of the conventional sorting machine 100, and the costs of the chain conveyer 30 and the carrier box 31 can be reduced.

Figure 1:
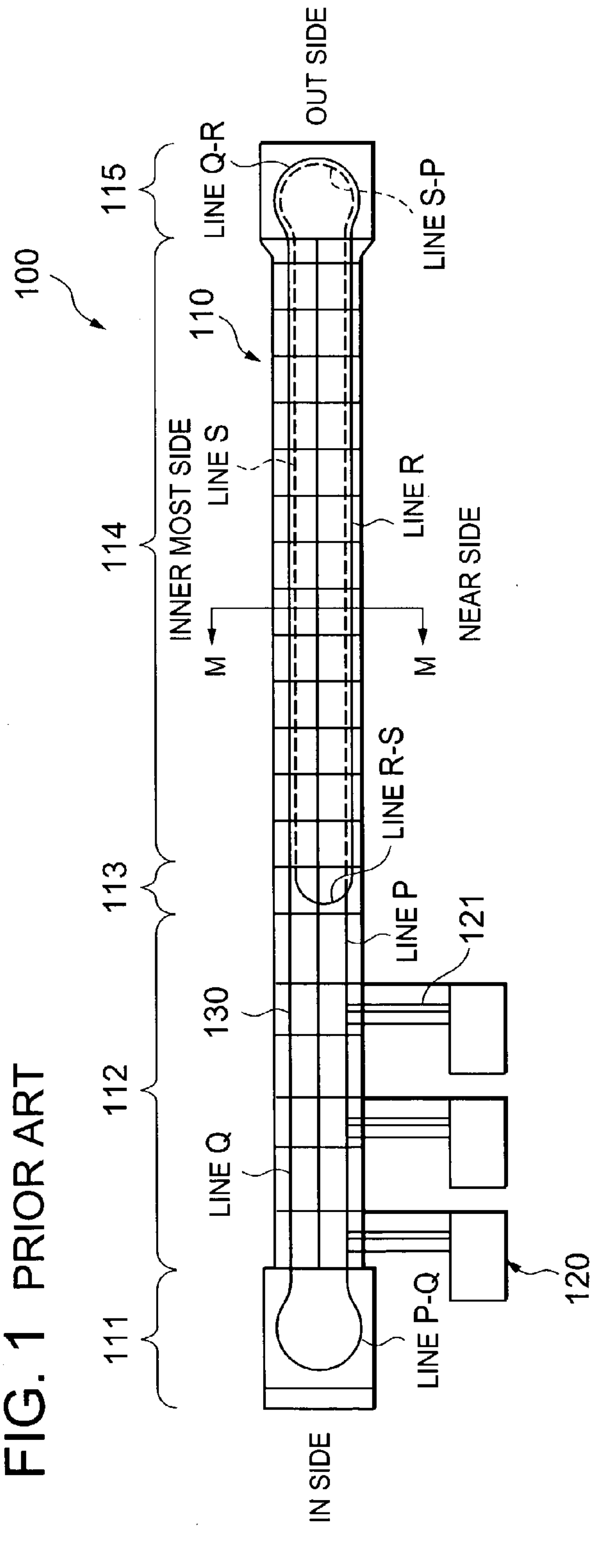
FIG. 1 PRIOR ART
FIG. 1 is a schematic top view of a conventional sorting machine.
Figure 2:
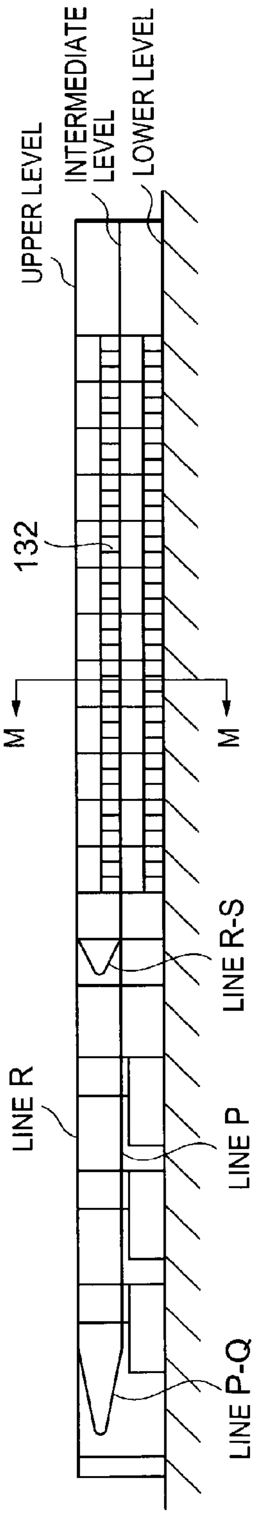
FIG. 2 PRIOR ART
FIG. 2 is a schematic top view of the conventional sorting machine.

Further, since the route of the chain conveyer 30 is made of one endless loop route, there is no need to provide the intermediate turn back portion 113 of the sorting machine 100 similarly to the conventional example shown in FIG. 1. Hence, the length of the sorting machine main body 10 can be shortened, and the installation space thereof can be saved.

Further, since it is enough to provide the chain conveyer 30 of two lines only, the structure of a frame to support the chain conveyer 30, which is a heavy material, can be made also small in size and light in weight.

Second Embodiment

Figure 9:
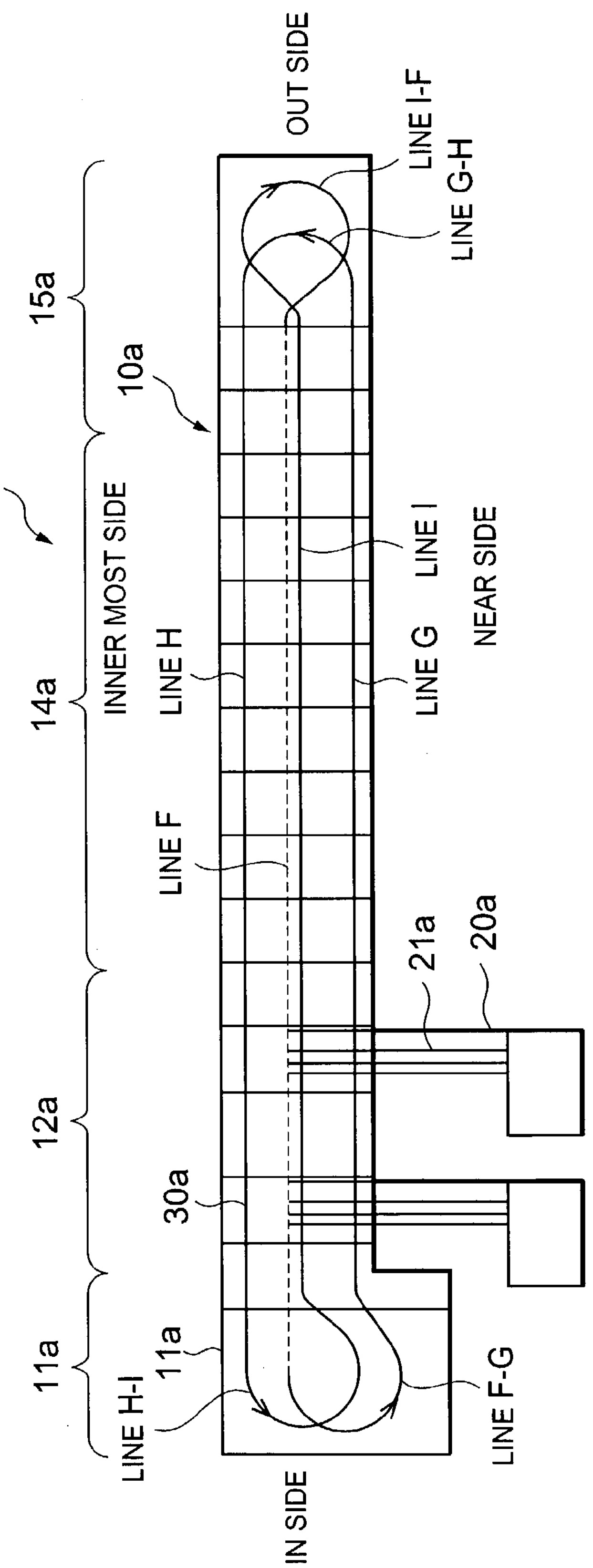
FIG. 9 is a top view of a second embodiment of the sorting machine of the present invention.
Figure 11:
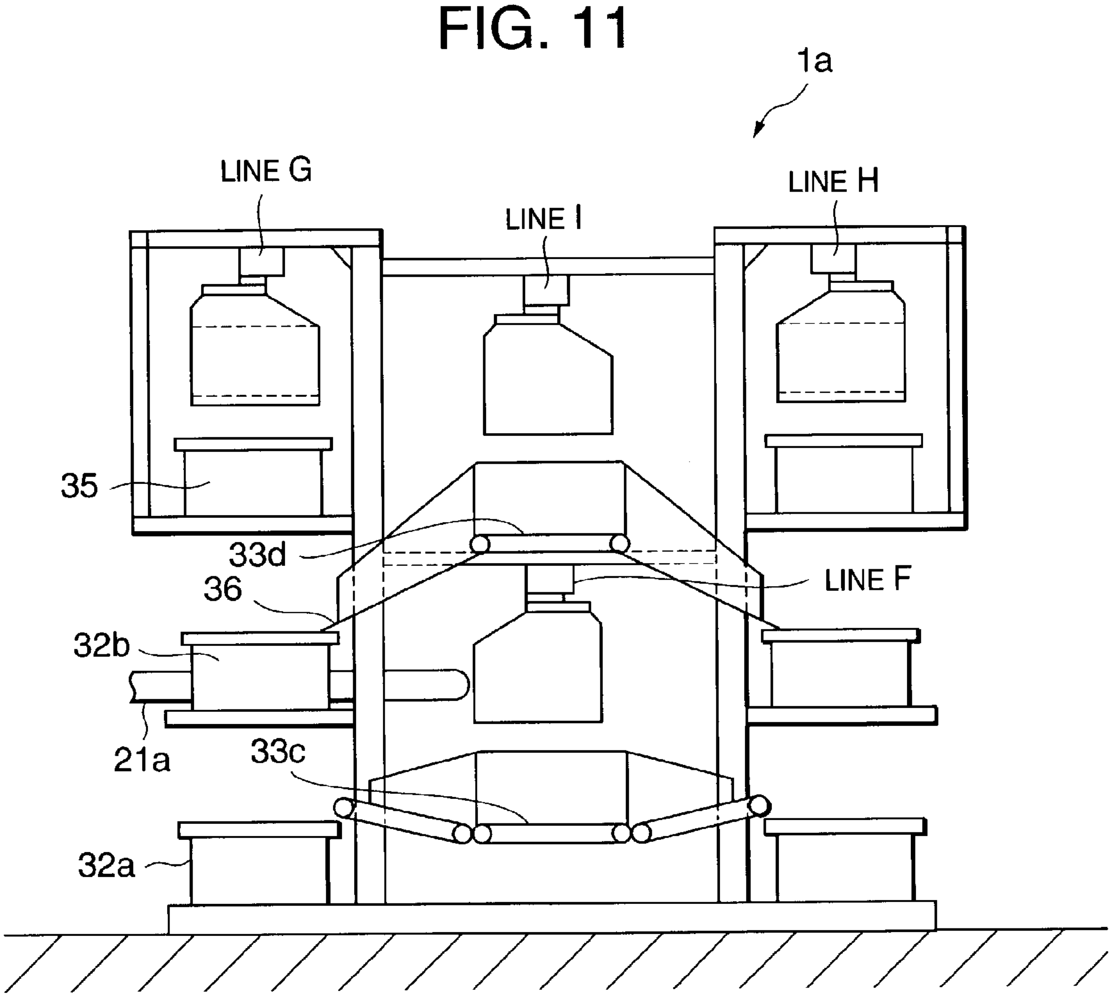
FIG. 11 is a sectional view taken on line E—E of FIG. 10.

Next, a second embodiment of the present invention will be described. FIG. 9 is a front view of a sorting machine 1*a* of the second embodiment of the present invention, and FIG. 10 is a top view thereof. FIG. 11 is an enlarged sectional view taken on line E—E of FIG. 10.

The sorting machine of the second embodiment provides gathering boxes further above the gathering boxes of the upper and lower two levels, in addition to the structure of the first embodiment. To throw the lightweight mail items into the gathering boxes on the upper most level, the lines of the chain conveyers are also provided on both the left and right sides of the chain conveyers of the upper level. Other structures are almost the same as those of the first embodiment.

The sorting machine 1*a* of the present embodiment includes a sorting machine main body 10*a* for sorting a lightweight mail item and a feeder 20*a* for feeding the lightweight mail item to the sorting machine main body 10*a*.

This sorting machine main body 10*a* has a chain conveyer 30*a* along a loop route, which combines endless loop routes of the upper and intermediate levels of the center portion and the endless loop route of the upper level outer peripheral portion. Moreover, this sorting machine main body 10*a* includes an IN side turn back portion 11*a*, a transfer portion 12*a*, a sorting portion 14*a*, and an OUT side turn back portion 15*a* in this order from the IN side.

The endless loop route of the chain conveyer 30*a* includes a line F provided in the center portion intermediate level of the sorting machine main body 10*a*, a line F-G inside of an IN side turn back portion 11*a*, a line G provided in the near side upper level coupled with the line F by the line F-G, a line G-H inside of an OUT side turn back portion 15*a*, a line H provided in the inner most upper level coupled with the line G by the line G-H, a line H-I inside of the IN side turn back portion 11*a*, a line I provided in the center portion upper level coupled with the line H by the line H-I, and a line I-F inside of the OUT side turn back portion 15*a* which connects the line I and the line G.

Incidentally, FIG. 9 shows the line F by a chain line, and the line I by a solid line. The line F and the line I lie one-upon-another. However, in FIG. 9, they are illustrated in such a manner as to be shifted from each other for a better understanding.

The sorting portion 14*a*, as shown in FIG. 11, has the lower level gathering boxes 32*a* juxtaposed below both the left and right sides of the carrier box 31 of the line F and, below the line F, there is provided a lower level belt conveyer 33*c* for conveying the lightweight mail items, which are dropped from the carrier box 31 of the line F, to the lower level gathering boxes 32*a*.

Incidentally, the lower level belt conveyer 33*c* is installed with a slope given to it to be raised to the lower level gathering boxes 32*a* in order to convey the lightweight mail items to the lower level gathering boxes 32*a*.

Further, intermediate level gathering boxes 32*b* are juxtaposed below both the left and right sides of the carrier box 31 of the line I, and an intermediate level belt conveyer 33*d* for conveying the lightweight mail items, which are dropped from the carrier box 31 of the line I, to the intermediate level gathering boxes 32*b* is installed.

Further, a chute 36 is provided between the intermediate level belt conveyer 33*d* and the intermediate level gathering box 32. The lightweight mail items, which are dropped from the carrier box 31 of the line I, are conveyed to the chute 36 by the intermediate level belt conveyer 33*d*, and slide off the chute 36 by their own weight thereof and move into the intermediate level gathering box 32*b*.

Needless to say, the intermediate level belt conveyer 33*d* may be installed with a slope given to it so as to be lowered to the intermediate level gathering boxes 32*b* in order to covey the lightweight mail items to the intermediate level gathering boxes 32*b*. In this case, the chute 36 can be omitted.

The sorting portion 14*a* further juxtaposes the upper level direct gathering boxes 35 below the carrier boxes 31 of the lines G and H. The upper level direct gathering boxes 35 directly gather the lightweight mail items, which are dropped from the carrier boxes of the lines G and H, without going through the belt conveyer and the chute.

That is, the sorting portion 14*a*, when seen from the front, is of a three layer structure including the upper level direct gathering boxes 35 corresponding to the lines G and H, the intermediate level gathering box 32*b* corresponding to the line I, and the lower level gathering box 32*a* corresponding to the line F.

Incidentally, in the transfer portion 12*a*, the sorting machine main body 10*a* conveys the lightweight mail items to the carrier box 31 of the line F provided in the center portion intermediate level of the sorting machine main body 10*a*.

As described above, since the sorting machine 1*a* of the present embodiment comprises the lower level gathering box 32*a*, the intermediate level gathering box 32*b* and the upper level direct gathering box 35 in a three level structure, the length of the sorting machine main body 10*a* can be sharply shortened, and the installation space thereof can be effectively utilized.

Further, the sorting machine 1*a* can easily adjust the height of the lower level gathering box 32*a* and the intermediate level gathering box 32*b* by changing the slope of the lower level belt conveyer 33*c* and the intermediate level belt conveyer 33*d*, so that the lower level gathering box 32*a* and the intermediate level gathering box 32*b* can be set at a height, from which they can be easily taken out.

Although the above-described first and second embodiments use the belt conveyer as conveying means, only the chute used in the second embodiment may be used. By so doing, the part cost of the belt conveyer can be reduced.

Further, as for the carrier means, the carrier means for example, such as an absorption system and a mechanical chuck system can be used.

Furthermore, though the sorted items are described as the lightweight mail items, it is understood that the sorted items are not limited to the lightweight mail items.

While the present invention has been described in its preferred embodiments, it is to be understood that the subject matter encompassed by the present invention is not limited to those specific embodiments. On the contrary, it is intended to include all alternatives, modifications, and equivalents of the invention as can be included within the spirit and scope of the following claims.

What is claimed is:

1. A sorting machine, comprising:

a carrier portion for mounting loads;

a delivery portion for delivering said carrier portion along a delivery route;

gathering portions disposed on both the left and right sides of the delivery route for gathering said loads; and conveyance portions for conveying said loads from a location on said delivery route to said gathering portions;

wherein said delivery portion comprises an upper level and a lower level and delivers said carrier portion alone the upper and lower levels and between the upper and lower levels; and wherein said carrier portion has a plurality of compartments for mounting said loads.

2. A sorting machine, comprising:

a carrier portion for mounting loads;

a delivery portion for delivering said carrier portion along a delivery route;

gathering portions disposed on both the left and right sides of the delivery route for gathering said loads; and conveyance portions for conveying said loads from a location on said delivery route to said gathering portions;

wherein said delivery portion comprises an upper level and a lower level and delivers said carrier portion along the upper and lower levels and between the upper and lower levels; and wherein a partition board is provided between said conveyance portions which are adjacent to one another.

3. The sorting machine according to claim 2, wherein said carrier portion has a discharge portion for discharging said loads at a location on said delivery route.

4. The sorting machine according to claim 2, wherein said conveyance portions which are adjacent to one another convey said loads in different directions.

5. The sorting machine according to claim 2, wherein said conveyance portions comprise chutes.

6. The sorting machine according to claim 2, wherein said conveyance portions are down-sloped toward said gathering portions.

7. A sorting machine, comprising:

a carrier portion for mounting loads;

a delivery portion for delivering said carrier portion along a delivery route;

gathering portions disposed on both the left and right sides of said delivery route for gathering said loads; and conveyance portions for conveying said loads from a location on said delivery route to said gathering portions;

wherein part of said delivery portion lies upon another part of said delivery portion; and wherein said conveyance portions comprise belt conveyers.

8. A sorting machine, comprising:

a carrier portion for mounting loads;

a delivery portion for delivering said carrier portion along a delivery route;

gathering portions disposed on both the left and right sides of the delivery route for gathering said loads; and conveyance portions for conveying said loads from a location on said delivery route to said gathering portions;

wherein said delivery portion comprises an upper level and a lower level and delivers said carrier portion along the upper and lower levels and between the upper and lower levels; and wherein said conveyance portions are up-sloped toward said gathering portions.

9. A sorting machine comprising:

a continuous loop comprising an upper level and a lower level;

a carrier for carrying loads along the continuous loop including between the upper and lower levels;

gathering portions disposed at each of two opposite sides of the continuous loop; and conveyors;

wherein the carrier deposits the loads at locations on the continuous loop and the conveyors convey the deposited loads to the gathering portions; and wherein the conveyors comprise belt conveyors.

10. A sorting machine according to claim 9, wherein the continuous loop comprises a chain conveyor for conveying the carrier along the continuous loop.

11. A sorting machine comprising:

a continuous loop comprising an upper level and a lower level;

a carrier for carrying loads along the continuous loop including between the upper and lower levels;

gathering portions disposed at each of two opposite sides of the continuous loop; and conveyors;

wherein the carrier deposits the loads at locations on the continuous loop and the conveyors convey the deposited loads to the gathering portions; and wherein the carrier comprises a lid which opens to deposit the loads.

12. A sorting machine according to claim 11, wherein the conveyors comprise chutes.

13. A sorting machine comprising:

a continuous loop comprising an upper level and a lower level;

a carrier for carrying loads along the continuous loop including between the upper and lower levels;

gathering portions disposed at each of two opposite sides of the continuous loop; and conveyors;

wherein the carrier deposits the loads at locations on the continuous loop and the conveyors convey the deposited loads to the gathering portions; and wherein the conveyors are sloped upwardly towards the gathering portions.

* * * * *